United States Patent [19]

Holscher

[11] Patent Number: 4,691,524
[45] Date of Patent: Sep. 8, 1987

[54] ENERGY STORAGE AND RECOVERY

[75] Inventor: Hugo Holscher, Amsterdam, Netherlands

[73] Assignee: Shell Oil Company, Houston, Tex.

[21] Appl. No.: 891,798

[22] Filed: Aug. 1, 1986

[30] Foreign Application Priority Data

Aug. 6, 1985 [NL] Netherlands ............... 8502194

[51] Int. Cl.$^4$ ............................................. F01K 13/02
[52] U.S. Cl. ................................. 60/652; 60/398
[58] Field of Search ................... 60/398, 652, 659; 137/147; 405/53, 75; 290/52

[56] References Cited

U.S. PATENT DOCUMENTS

| | | | |
|---|---|---|---|
| 3,385,067 | 5/1968 | Van Eek | 61/5 |
| 4,022,687 | 5/1977 | Perren | 210/65 |
| 4,086,765 | 5/1978 | Gillian | 60/325 |
| 4,182,128 | 1/1980 | Gardner | 60/398 X |
| 4,364,228 | 12/1982 | Eller | 60/398 |

FOREIGN PATENT DOCUMENTS

| | | |
|---|---|---|
| 0191516 | 8/1986 | European Pat. Off. . |
| 0196690 | 8/1986 | European Pat. Off. . |
| 2001395 | 1/1979 | United Kingdom . |

Primary Examiner—Stephen F. Husar

[57] ABSTRACT

A method and apparatus for underground storage and recovery of energy is disclosed in which a first fluid having a relatively high density is pumped from the bottom of a second cavern to the bottom of a first cavern filled with a fluid having a relatively low density by means of an overground pump/turbine apparatus. The relatively low density fluid is displaced out of the first cavern to the second cavern through an overhead connection which is filled with the second fluid. The stored energy is retrieved as the high density fluid is allowed to return to the second cavern and drives the pump/turbine.

34 Claims, 1 Drawing Figure

U.S. Patent  Sep. 8, 1987  4,691,524
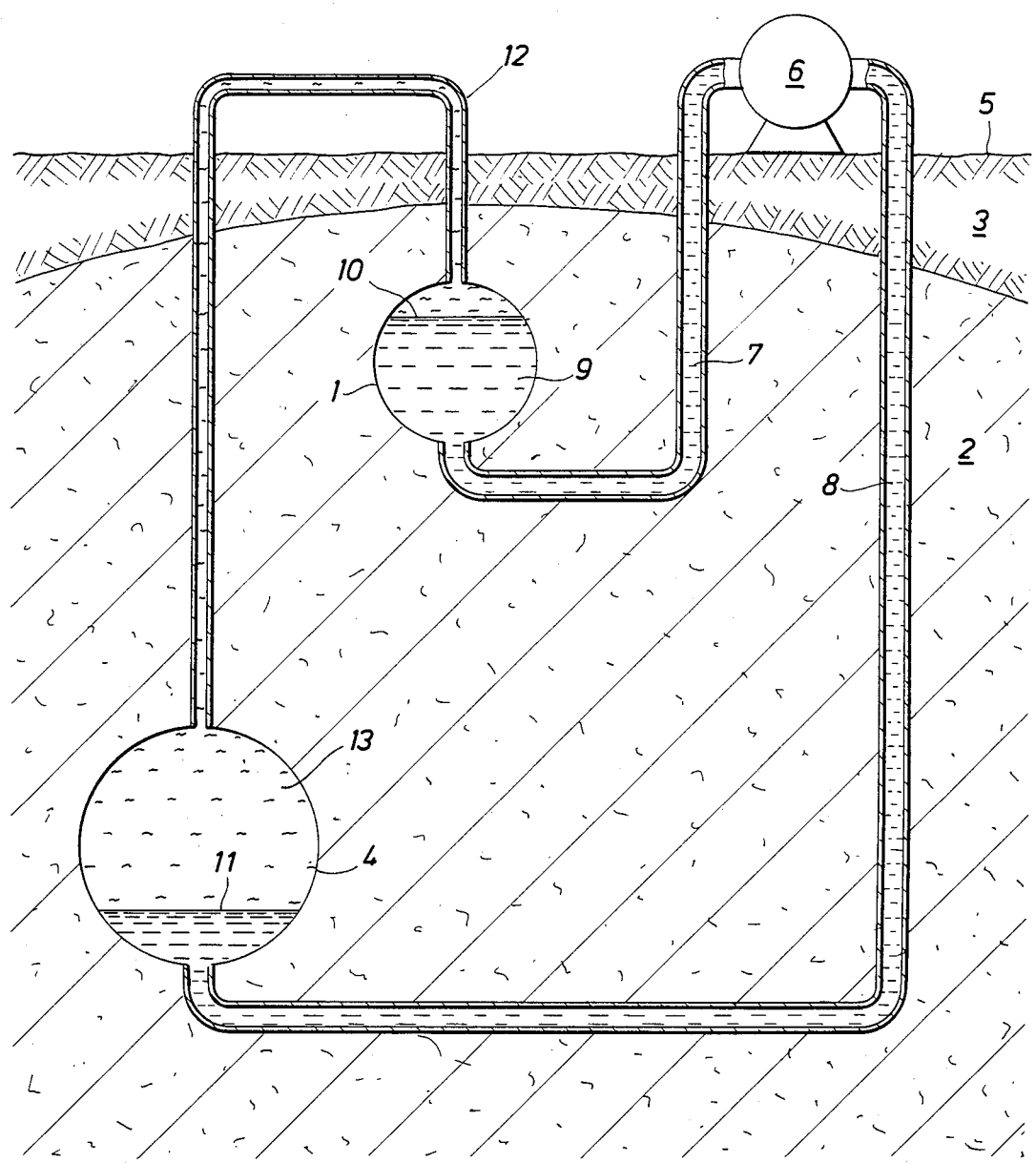

4,691,524

ENERGY STORAGE AND RECOVERY

BACKGROUND OF THE INVENTION

The invention relates to a system for the storage and recovery of energy comprising a first storage space partly filled with a fluid, a second storage space, and a pump/turbine unit.

Various energy storage and recovery systems are widely known. In one known system the first storage space consists of a lake at a high location and the second storage space consists of a lake at a lower location or of an underground cavern, and there is a connecting line between the bottom part of the first storage space and the bottom part of the second storage space. Moreover, in such a system the pump/turbine unit is installed in the connecting line and located at the same height as or lower than the lower second storage space. Thus, during normal operation, the pump/turbine unit pumps a liquid from the second storage space to the higher, first storage space, and the turbine is driven by the liquid flowing back from the higher, first storage space to the lower, second storage space.

The pump of such a system is usually driven by an electric motor connected by an electric line to an electric network, and the turbine then drives an electric generator which is also connected by an electric line to an electric network. Such a system enables an excess of electrical energy to be used to pump the liquid to the higher, first storage space, while a storage of electrical energy can be supplemented by electrical energy generated by the electrical generator driven by the turbine, which is itself driven by liquid flowing back to the lower, second storage space. In the case of the second storage space being an underground cavern, it is necessary to make an additional separate space for the pump/turbine unit and to make a separate shaft through which to run an electric line of sufficient size to carry the electrical energy to the electric motor and from the electric generator since the pump/turbine unit is installed near the lower second storage space. This makes such a system extremely costly.

SUMMARY OF THE INVENTION

The object of the invention is to overcome the drawbacks of the necessity and costs of additional and separate spaces and shafts for underground energy storage and recovery.

Therefore, the system for the storage and recovery of energy employs a first storage space partly filled with a first fluid having a relatively high density (the heavier fluid), a second storage space partly filled with a second fluid having a relatively low density (the lighter fluid), which fluids are hardly or not at all miscible with each other, a connecting line filled with the second fluid and located between the top part of the first storage space and the top part of the second storage space, and a pump/turbine unit at approximately the same height as, or above, the first storage space. The pump/turbine unit is connected to the bottom part of the first storage space and to the bottom part of the second storage space in order, during normal operation, to be able to pump the first fluid from the second storage space to the first storage space or to be driven by the first fluid flowing from the first storage space to the second storage space.

In an advantageous embodiment, the first storage space can also contain the second fluid above the first fluid.

The second storage space can be located below the first storage space. The second storage space can be an underground cavern which can be formed in any hard rock. A particularly suitable rock is rock salt. This has the advantage that the underground cavern can be formed by dissolving the salt.

The first storage space can also be an underground cavern. In that case it is favorable to form both underground storage spaces in rock salt.

The connecting line which connects the tops of the storage spaces with each other can, in an advantageous embodiment of the invention, be located partly above ground.

The invention also relates to a process for the storage and recovery of energy with the aid of the system according to the invention, comprising:

(a) pumping the first fluid, with the aid of the pump/turbine unit, from the second storage space to the first storage space which is partly filled with the second fluid, causing the second fluid to be displaced out of the first storage space and to flow via the connecting line, filled with the second fluid and connecting the tops of the storage spaces with each other, to the second storage space;

(b) interrupting the pumping of the first fluid;

(c) allowing the first fluid, displaced from out of the first storage space by the second fluid flowing back from the second storage space via the said connecting line, to flow back to the second storage space;

(d) allowing the pump/turbine unit to be driven by the returning first fluid; and (e) interrupting the return flow of the first fluid.

BRIEF DESCRIPTION OF THE DRAWING

By way of example, the invention will now be discussed in detail with reference to the drawing in which:

FIG. 1 is a partial cross-section of the system shown schematically in a "loaded" state, i.e. the first fluid is being pumped from the second storage space to the first storage space, and in which energy can be delivered.

DESCRIPTION OF THE PREFERRED EMBODIMENT

The system for storing and recovering energy comprises a first underground storage space 1 located, for example, at a depth of 1000 m in a salt dome 2 situated beneath an earth layer 3, and a second underground storage space 4 located in the salt dome 2 below the first storage space 1, for example at a depth of 1500 m. The storage spaces may or may not have the same volume.

The system further comprises a pump/turbine unit 6 located at the earth's surface 5 above the upper storage space 1, the pump/turbine unit consisting of a pump connected by a shaft to an electric generator. For the sake of simplicity, the pump/turbine unit is only shown schematically and is not drawn in detail.

The inlet of the turbine is connected to the first line 7 by a supply pipe provided with a shutoff valve, and the outlet of the turbine is connected to the second line 8 by a discharge pipe provided with a shutoff valve. For the sake of simplicity, the supply and discharge lines of the pump/turbine, as well as the shutoff valves, are not drawn. For a more detailed explanation of the construction and functioning of the pump/turbine unit, see the related Netherlands patent application No. 8500435, filed on Feb. 15, 1985.

In the stationary state, the shutoff valves are closed.

If there is an excess of electrical energy, this is fed to the electric motor of the pump in order to drive the pump, and the shutoff valves of the pump are opened so that the first fluid is pumped from the second storage space 4 to the bottom part of the first storage space 1 via the second line 8, the pump and the first line 7. This results in the level of the first fluid rising in the first storage space 1, and the fluid pressure in the turbine supply line rising too.

When the second fluid in the first storage space 1 has been displaced or compressed to such an extent that fluid pressure in the turbine supply line is sufficiently high, the pumping of the first fluid will be interrupted by stopping the pump and closing the shutoff valves of the pump. In doing so, care must be taken to ensure that the second fluid cannot flow into the first line 7.

When it is necessary to recover the stored energy, for example in the case of a high demand for electrical energy, only the shutoff valves of the turbine will be opened. The first fluid, driven by second fluid, will then flow back from the first storage space 1 to the second storage space 4 via the first line 7, the turbine and the second line 8. The returning first fluid sets the turbine in motion. This drives the electric generator which in turn generates electrical energy which can be fed into the electric network.

The pump/turbine unit 6 is connected to the bottom part of the first storage space 1 by a first line 7, and to the bottom part of the second storage space 4 by a second line 8. The first line 7 comprises a borehole provided with a pipe (not drawn), and the second line 8 comprises a borehole provied with a pipe (not drawn).

A connecting line 12 is filled with the second fluid and connects the top of the first storage space 1 to the top of the second storage space 4.

The electric motor is connected by an electric line (not shown) to an electric network (not shown) in order to draw electrical energy from it, and the electric generator is connected by an electric line (not shown) to the electric network in order to supply electrical energy to it.

The first storage space 1 is at least partly filled with a first fluid having a relatively high density (the heavier fluid), for example a liquid such as brine 9 having a density of 1200 kg/m$^3$, and the second storage space 4 is filled at least partly with a second fluid 13 that may be an incompressible or compressible medium whose pressure at ground level is higher than that of the first fluid. Suitable media are, for example, liquefied propane or a gas such as nitrogen under a high pressure, e.g. 200 bar. To this end, the line 12 comprises high-pressure generating devices at suitable points, for example compressors (not drawn). The liquid 9 also occupies the first line 7, the pump/turbine unit 6, the second line 8 and the bottom part of the second storage space 4; and there is also gas in the top part of the first storage space 1 above the liquid 9. The numeral 10 refers to the interface between the two immiscible fluids in the first storage space 1, and the numeral 11 refers to the interface between the two immiscible fluids in the second storage space 4.

The inlet of the pump is connected to the second line 8 by means of a supply pipe provided with a shutoff valve, and the outlet of the pump is connected to the first line 7 by a discharge pipe provided with a shutoff valve.

When the second fluid 13 in the first strorage space 1 has moved or expanded sufficiently the return flow of the first fluid is interrupted by closing the shutoff valves of the turbine. The system will then again be in its stationary state. When interrupting the return flow of the first fluid, care must be taken to assure a continued supply of lighter fluid to the pump.

It is subsequently possible to repeat the process of storing energy and then recovering it according to the above described process.

In the above described system, the pump and turbine are separate, but the pump/turbine unit can also consist of a hydraulic machine which can function both as a pump and as a turbine, which hydraulic machine is connected to an electric machine which can function both as a motor and as a generator.

To prevent the fluid from getting too hot during the operation of the system, the system can be provided with a heat exchanger (not shown) to cool the fluid.

The second fluid can consist of suitable media such as nitrogen or liquefied propane, as already indicated above.

The first fluid can also be oil or liquefied petroleum gas. Water can also be used, in particular if the underground part of the system is formed in a rock which is not affected by water.

It is noted that the invention is not limited to the use of first and second fluids which are by nature immiscible or barely miscible, but the invention can also be employed with naturally miscible fluids that are separated by a suitable intermediate layer that prevents mixing. A non-limiting example of such a system is brine/water separated by an oil layer of suitable density.

Instead of an electric motor to drive the pump, the system can also comprise a turbine (not shown) which drives the pump. The turbine is itself driven by a compressed gas, for example natural gas.

What is claimed is:

1. A system for the storage and recovery of energy comprising:
   a first storage space partly filled with a first fluid having a relatively high density;
   a second storage space partly filled with a second fluid having a relatively low density, which fluids are hardly or not at all miscible with each other;
   a connecting line filled with the second fluid and located between the top part of the first storage space and the top part of the second storage space; and
   a pump/turbine unit at approximately the same height as, or above, the first storage space, the pump/turbine unit being connected to the bottom part of the first storage space and to the bottom part of the second storage space in order, during normal operation, to be able to pump the first fluid from the second storage space to the first storage space or to be driven by the first fluid flowing from the first storage space to the second storage space.

2. A system according to claim 1 wherein the first storage space also contains the second fluid above the first fluid present in said first storage space.

3. A system according to claim 1 wherein the second storage space is located below the first storage space.

4. A system according to claim 1 wherein the second storage space is an underground cavern.

5. A system according to claim 1 wherein the first storage space is an underground cavern.

6. A system according to claim 5 wherein the connecting line runs partly overground.

7. A system according to claim 1 wherein the pump/turbine unit is located above the first storage space.

8. A system according to claim 4 wherein the pump/turbine unit is located substantially at the earth's surface.

9. A system according to claim 1 wherein the second fluid is an incompressible medium.

10. A system according to claim 1 wherein the second fluid is a compressible medium.

11. A system according to claim 10 wherein the second fluid is a gas.

12. A system according to claim 11 wherein the second fluid is nitrogen under high pressure.

13. A system according to claim 1 wherein the first fluid is a liquid.

14. A system according to claim 13 wherein the first fluid is liquefied petroleum gas.

15. A system according to claim 13 wherein the first fluid is oil.

16. A system according to claim 13 wherein the first fluid is water.

17. A system according to claim 13 wherein the first fluid is brine.

18. A system according to claim 9 wherein the second fluid is a liquid.

19. A system according to claim 18 wherein the second fluid is liquefied propane under high pressure.

20. A process for the storage and recovery of energy comprising:
   (a) pumping a first fluid from a second storage space to a first storage space, which is partly filled with a second fluid, through a second line connected between the second storage space and a pump/turbine unit, through the pump/turbine unit which drives the first fluid and through a first line to a first storage space at or below the height of the pump/turbine unit, causing the second fluid to be displaced out of the first storage space and to flow to the second storage space via a connecting line which connects the tops of the first and second storage spaces with each other and is filled with the second fluid;
   (b) interrupting the pumping of the first fluid;
   (c) allowing the first fluid, displaced from out of the first storage space by the second fluid flowing back from the second storage space via the connecting line, to flow back to the second storage space through the first line connected between the first storage space and the pump/turbine unit substantially at or above the elevation of the first storage space and through a second line connecting the turbine with the second storage space at a substantially lower elevation;
   (d) allowing the pump/turbine unit to be driven by the returning first fluid; and
   (e) interrupting the return flow of the first fluid.

21. A system for the storage and recovery of energy comprising:
   a first underground cavern;
   a first fluid having a relatively high density partly filling the first underground cavern;
   a second underground cavern lower than the first underground cavern;
   a connecting line located between the top of the first underground cavern and the top of the second underground cavern;
   a second fluid having a relatively low density filling the connecting line and partly filling the second underground cavern;
   a pump located at least substantially as high as the first underground cavern which is connected between the bottoms of the first and second underground caverns;
   a turbine located substantially adjacent the pump, said turbine being connected to the bottom of the first and second underground caverns;
   means for initiating pumping when there is an excess of electrical energy to pump the first fluid from the second storage space to the first storage space; and
   means to initiate driving the turbine responsive to a shortage of electrical energy whereby the turbine is driven by the first fluid flowing back from the higher, first underground cavern to the lower, second underground cavern.

22. A system according to claim 21 wherein the connecting line runs partly overground.

23. A system according to claim 21 wherein the pump and the turbine are located above the first underground cavern.

24. A system according to claim 23 wherein the pump and the turbine are located substantially at the earth's surface.

25. A system according to claim 21 wherein the second fluid is an incompressible medium.

26. A system according to claim 21 wherein the second fluid is a compressible medium.

27. A system according to claim 26 wherein the second fluid is nitrogen under high pressure.

28. A system according to claim 21 wherein the second fluid is liquefied propane under high pressure.

29. A system according to claim 21 wherein the first fluid is a liquid.

30. A system according to claim 29 wherein the first fluid is liquefied petroleum gas.

31. A system according to claim 29 wherein the first fluid is oil.

32. A system according to claim 29 wherein the first fluid is water.

33. A system according to claim 29 wherein the first fluid is brine.

34. A process for the storage and recovery of energy comprising the following steps:
   storing energy, comprising:
      driving a pump with electrical power during periods of excess electrical power;
      pumping a first fluid from the bottom of a second storage space through the pump which is substantially higher than the second storage space to the bottom of a first storage space which is higher than the second storage space but which is substantially at or below the height of the pump;
      displacing a lighter second fluid, substantially immiscible with the first fluid, from the first storage space as the heavier first fluid is pumped in;
      conducting the second fluid displaced from the first storage space to the second storage space through a connecting line connected to the tops of the first and second storage spaces;

interrupting the pumping of the first fluid; and
holding a quantity of the first fluid in the first storage space; and releasing the stored energy, comprising:
releasing the first fluid from the first storage space to flow to a turbine without any substantial net loss of elevation and from the turbine down to the second storage space at a substantially lower elevation during times of a shortage of electrical energy;

driving a turbine with the returning first fluid;
generating electrical power with the driven turbine; and
feeding the electrical power generated into the electrical network.

* * * * *